Figure 1:
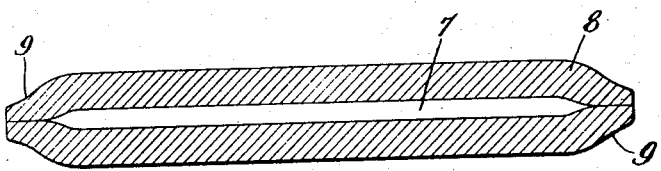

April 8, 1930.  G. FAILLA  1,753,287

METHOD AND MEANS FOR APPLYING RADIUM EMANATION

Filed May 15, 1925

Inventor
Givacchino Failla
By his Attorneys
Edwards, Sager & Bower

Patented Apr. 8, 1930

1,753,287

UNITED STATES PATENT OFFICE

GIOACCHINO FAILLA, OF NEW YORK, N. Y.

METHOD AND MEANS FOR APPLYING RADIUM EMANATION

Application filed May 15, 1925. Serial No. 30,450.

This invention relates to a method of using radium emanation for therapeutic purposes such as the treatment of cancer or tumors or other diseases. In the use of radon or radium emanation a preferred form of treatment is to collect purified emanation in capillary glass tubes and insert the tubes in the affected tissue. The effect of the radiation from the radon is beneficial among other things in slowing down or stopping the abnormal growth of tissue as in tumors, for instance. An objection to this treatment with discrete masses of radon is the tendency that has been observed toward necrosis of the tissue in the immediate neighborhood of the embedded tube. Such necrotic tissue loses the characteristics of live tissue and must be eliminated by the system. Where the necrosis occurs near a nerve, for instance, it will cause discomfort and pain to the patient.

The object of my invention is to reduce the objectionable necrosis resulting from the radon tube treatment while maintaining the beneficial effects thereof, and I attain this object by selectively controlling the emitted radiation in desired manner through the material and construction of the containing tubes.

Radon itself emits only alpha rays but some of its disintegration products emit beta and gamma rays. The alpha rays are easily absorbed by matter; the beta rays are much more hard and penetrating but nevertheless by far the largest part of the beta radiation is absorbed by a few millimeters of human tissue. The gamma rays are the most penetrating rays known and they go through matter with little absorption. One centimeter of tissue absorbs only a small percentage of this radiation.

Both beta and gamma rays affect a living cell causing its death if the dose is sufficiently large. Measuring the amount of radiation at different distances from the tube, irrespective of whether it is beta or gamma radiation, the intensity decreases very rapidly at first and then more slowly. This is due to two causes: (1) A large part of the beta and some of the gamma radiation is absorbed by the first few millimeters of tissue. (2) The intensity of radiation varies inversely as the square of the distance (for a point source) on account of the spreading of the rays. Accordingly the cells in the immediate neighborhood of the tube receive much larger doses of radiation than cells at a distance. I find that in practice when a small glass tube (of 0.3 mm. outside diameter, and 4 mm. length) containing one millicurie of radon, is buried in animal tissue, the cells within the radius of about 3 mm. have been killed completely. Tissue changes of a different type can be observed microscopically in a zone two or three mm. wide surrounding this necrotic area. As long as discrete sources of radiation are used, instead of distributing the radio-active material through the tumor mass, there can be no uniform distribution of radiation through the tumor. All attempts, however, to attain a uniform distribution of the radioactive material in the tumor have proved unsatisfactory and the preferred method at the present time therefore remains the one in which many small sources of radiation are introduced into the tissue to be treated. It has also been found that a long continued irradiation of low intensity is more effective in the treatment of certain tumors particularly in the mouth.

I have found that the objection to this preferred method can be overcome by using tubes which will filter out a large part or all of the beta radiation and at the same time pass the gamma radiation and be insertable in desired manner and distribution in the affected tissue. In this way the intensity of the radiation effect immediately around the source is greatly reduced and I have found that the gamma rays pass through this nearby tissue and produce the beneficial effects desired without developing the objectionable necrotic area above described.

In the accompanying drawing illustrating the invention—

Figure 2:
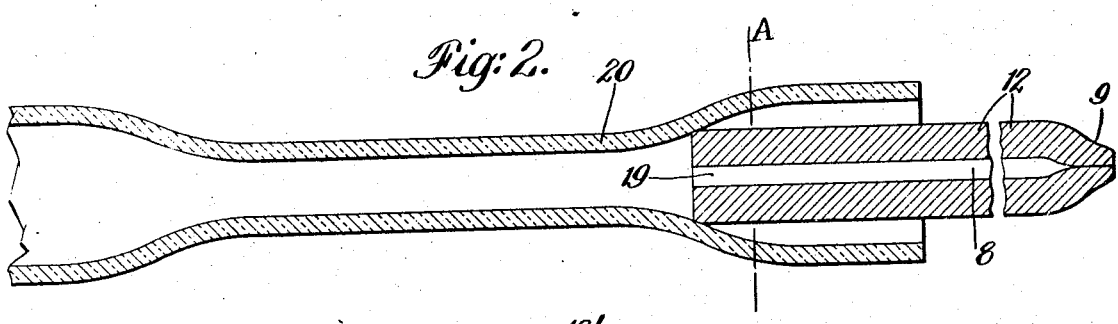
Figure 3:
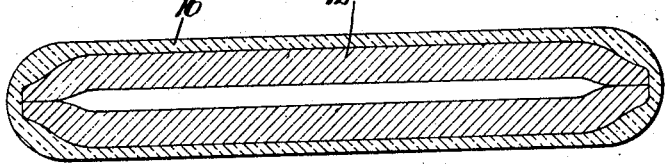
Figure 4:
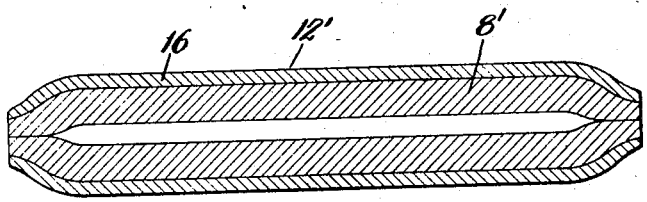
Figure 5:
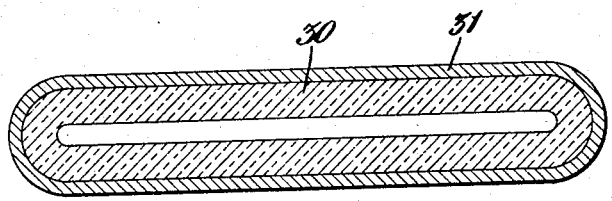

Fig. 1 is a sectional view of a new form of tube adapted to apply the radium emanation according to my method, Fig. 2 is a sectional view of a method of filling the tube with the radium emanation, and Figs. 3, 4 and 5 are views similar to Fig. 1 but illustrating modified forms of tubes.

In Fig. 1 the radon is contained in the bore 7 of a tube 8 formed of a heavy metal such as gold or platinum, the tube being sealed at each end 9. I have found that such a tube while reducing the beta radiation passes the gamma radiation in sufficient quantities to produce the desired effects. To filter out or absorb the beta rays of thickness of 0.4 to 0.5 mm. of either gold or platinum is required but a thickness of from 0.2 to 0.3 mm. reduces the transmitted radiation of beta rays to a small percentage. In order to make the outside diameter of the tube as small as possible therefore I use this wall thickness, the bore being about 0.2 mm. Animal experiments showing favorable results have been made with gold tubes having an outside diameter of 0.6 and 0.8 mm. for 0.2 and 0.3 mm. wall thicknesses respectively and the length of the tubes varying from 5 to 10 mm. with radon content from 1 to 6 millicuries.

Thicker tubes would give a further reduced beta radiation while passing sufficient gamma radiation but the disadvantages of the increased thickness of the tube would apparently outweigh any advantages thereof. The tube should be of as small diameter as possible not only for ease of insertion or removal but also because it is very desirable to be able to leave the tubes permanently in the tissue without necessity of having to remove them after a certain dose has been administered, and the larger the tube the greater will be the necessity of removing it and the more likely it is to cause discomfort to the patient.

In filling the tube with radium emanation a piece of tubing 12 (Fig. 2) of sufficient length to make the desired number of small tubes (such as shown in Fig. 1) is pinched at one end and soldered to make that end gas-tight. This can be done by fusing the end or using suitable cement, such as De Khotinsky's. The other end 19 of the tube is left open and is attached to the glass tube 20 providing the radium emanation. This glass tube 20 is drawn down to the shape shown in Fig. 2, the inside diameter of the constriction being less than the outside diameter of the metal tube 12. The open end 19 of the metal tube is then inserted into one end of the glass tube to determine how far into the constricted section it will go. The glass tube is then cut at a section such as A, A', Fig. 2, and the space between the metal and glass is filled with hot cement, the glass tube being also heated. In this way a gas-tight joint is made. The large end of the glass tube 20 is sealed to the collection apparatus and after thoroughly exhausting the tube 20 and the tube 12 the desired amount of emanation is passed through tube 20 into the tube 12 and the mercury above which the emanation is collected is raised to within a fraction of a millimeter of the metal 12 which is then pinched off close to the glass tube. The tubing 12 is then finally divided into the desired number of short tubes by pinching. The process of pinching the tubing into sections does not lose emanation because the gas in the tube is initially under less than atmospheric pressure. For this reason also there is no tendency for the radon to escape even if the ends of the tube are not hermetically sealed.

The radon content of the individual tubes is ascertained by electroscopic measurements and since the rate of disintegration of radon is accurately known it is a simple matter to determine whether any gas escapes from the tubes by making measurements at different intervals.

The pinched seal 9 is preferably made by a pair of pliers whose cutting edges have been rounded somewhat so as not to be too sharp and the tubes thus cut have wedge-shaped ends slightly wider than the tube diameter. These ends may of course be rounded in any desired manner as by pressing them against a rapidly revolving tool or covering the sharp ends with a suitable material or by the instantaneous application of intense heat, and it is obvious that other methods of forming the ends of the tubes can be adopted.

This radium emanation capillary tube or seed of heavy metal can be made very small as above pointed out and is easily applied and may be left permanently in place. Due to the reduction of the beta radiation below the danger point objectionable necrosis of the tissue around the tube is avoided or greatly reduced at will, while at the same time the beneficial action of the gamma rays is maintained. This invention therefore removes the objection to the buried tube method of treatment with radium emanation and brings this method into very close correspondence with the desired results. Such slight necrosis of the tissue as may remain is practically negligible in amount and not objectionable.

The above description has dealt with the reduction or elimination of the primary beta rays, but when the gamma rays passing through the tube strike the matter of the tube secondary rays of the beta type are necessarily produced whether or not the thickness of the tube is sufficient to absorb all the primary beta radiation or not. Consequently secondary beta rays will be emitted by the tube and will be absorbed in the surrounding tissue. Since heavy metals emit more secondary beta rays than substances of small atomic weight, this secondary beta radiation may be decreased by coating the metal tube 12' of Fig. 3 with some suitable organic material 16 such as celluloid, collodion, enamel or the like, though the resulting increase in external diameter is in general objectionable. Or as shown in Fig. 4 the metal tube 12' may combine an inner portion 8' of heavy metal and an outer sheath 16' of light metal having a low atomic weight.

Since the presence of a heavy metal in any form will impede the radiation of the beta rays, this heavy metal such as lead may be contained in the glass of a glass tube such as 30 of Fig. 5. Lead glass containing as much as 75% lead has been obtained and while glass with a high uranium content would be best this is apparently hard to procure. The glass tube 30, Fig. 5, either with or without the heavy metal may be electroplated with a heavy metal by being first silvered as in making mirrors and then plated with an outer covering of heavy metal 31.

It is obvious that in any case a metal alloy may be used and that while the above description is made in connection with specific examples the invention is not confined thereto but is intended to cover any method or apparatus falling within the scope of the appended claims.

I claim:

1. Apparatus for applying radium emanation comprising a capillary tube having walls containing a sufficient quantity of heavy metal to reduce the primary beta radiation with another material to reduce the secondary beta radiation while passing the hard gamma radiation, the ends of said tube being sealed to retain radium emanation in the bore of the tube.

2. Apparatus for applying radium emanation within tissue to be treated adapted to be inserted therein comprising a capillary tube having walls of approximately 0.3 mm. thickness to absorb the beta rays sufficiently to avoid undesirable necrosis and with the outside diameter of the tube not greater than 0.8 mm., so that the thickness of the walls is greater than the diameter of the bore, the ends of the tube being enclosed to contain radium emanation under less than atmospheric pressure and the whole of the tube being made of solid metal of high atomic weight adapted to reduce the primary beta radiation at all points.

3. Apparatus for applying radium emanation comprising an inner tube of heavy metal of sufficient thickness to eliminate the primary beta radiation and an outer tube of light metal to reduce the secondary beta radiation while passing the hard gamma radiation, the ends of said tube being sealed to retain radium emanation in the bore of the tube.

4. A radium emanation seed for implantation in tissue, comprising in its walls a filtering metal substantially reducing the beta radiation while transmitting the gamma rays, and a covering of light metal therefor to reduce its secondary beta radiation.

5. Apparatus for applying radium emanation within tissue to be treated comprising a capillary tube of solid metal of high atomic weight adapted to reduce at all points the primary beta radiation of radium not more than six millicuries of emanation contained in said tube so that said tube may be permanently implanted in the tissue, the ends of said tube being closed and sealed by pinching without melting the tubing to compress the end surfaces of the tube into contact with each other to form the closing seal said emanation being under less than atmospheric pressure.

6. As a new article of manufacture an outer shell of metal of low atomic weight adapted to reduce secondary beta radiation, and an inner closed tube within said shell containing radium emanation, said inner tube being of material adapted to contain said emanation and to reduce the primary beta radiation thereof, said shell with its enclosed tube being of a size adapted for insertion into and removal from tissue being treated.

GIOACCHINO FAILLA.

CERTIFICATE OF CORRECTION.

Patent No. 1,753,287.  Granted April 8, 1930, to

GIOACCHINO FAILLA.

It is hereby certified that error appears in the printed specification of the above numbered patent requiring correction as follows: Page 3, line 68, claim 5, strike out the word "radium" and insert the same before the word "emanation" in line 69; same claim, line 77, after the word "pressure" and before the period insert the words "within said tube"; and that the said Letters Patent should be read with these corrections therein that the same may conform to the record of the case in the Patent Office.

Signed and sealed this 13th day of May, A. D. 1930.

(Seal)

M. J. Moore,
Acting Commissioner of Patents.